J. J. LEIDIGH.
CREDIT MARKING SYSTEM.
APPLICATION FILED JULY 2, 1906. RENEWED APR. 13, 1911.
1,145,152.
Patented July 6, 1915.
2 SHEETS—SHEET 1.
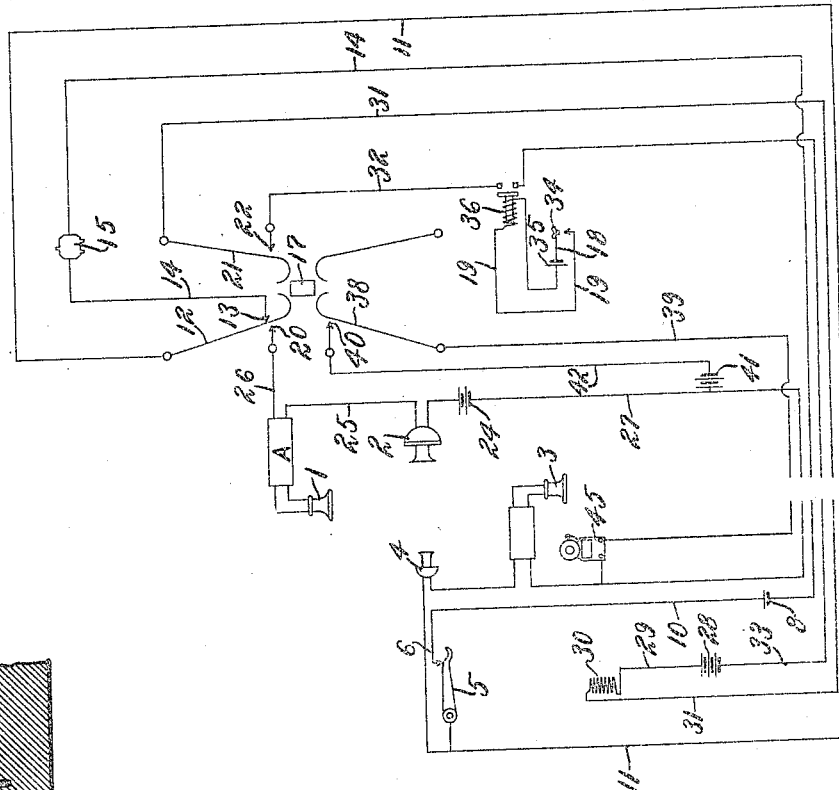
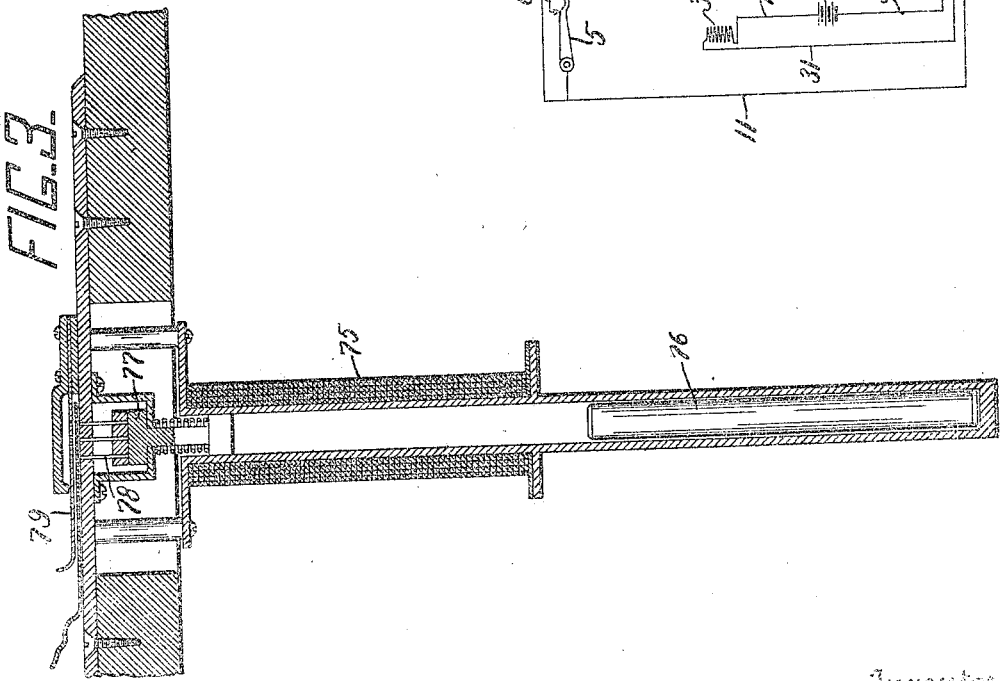
Witnesses
H. N. Lindsey Jr.
J. B. Ricketts
Inventor
John J. Leidigh
by R. Osborn
Carl Berndt
Attorneys

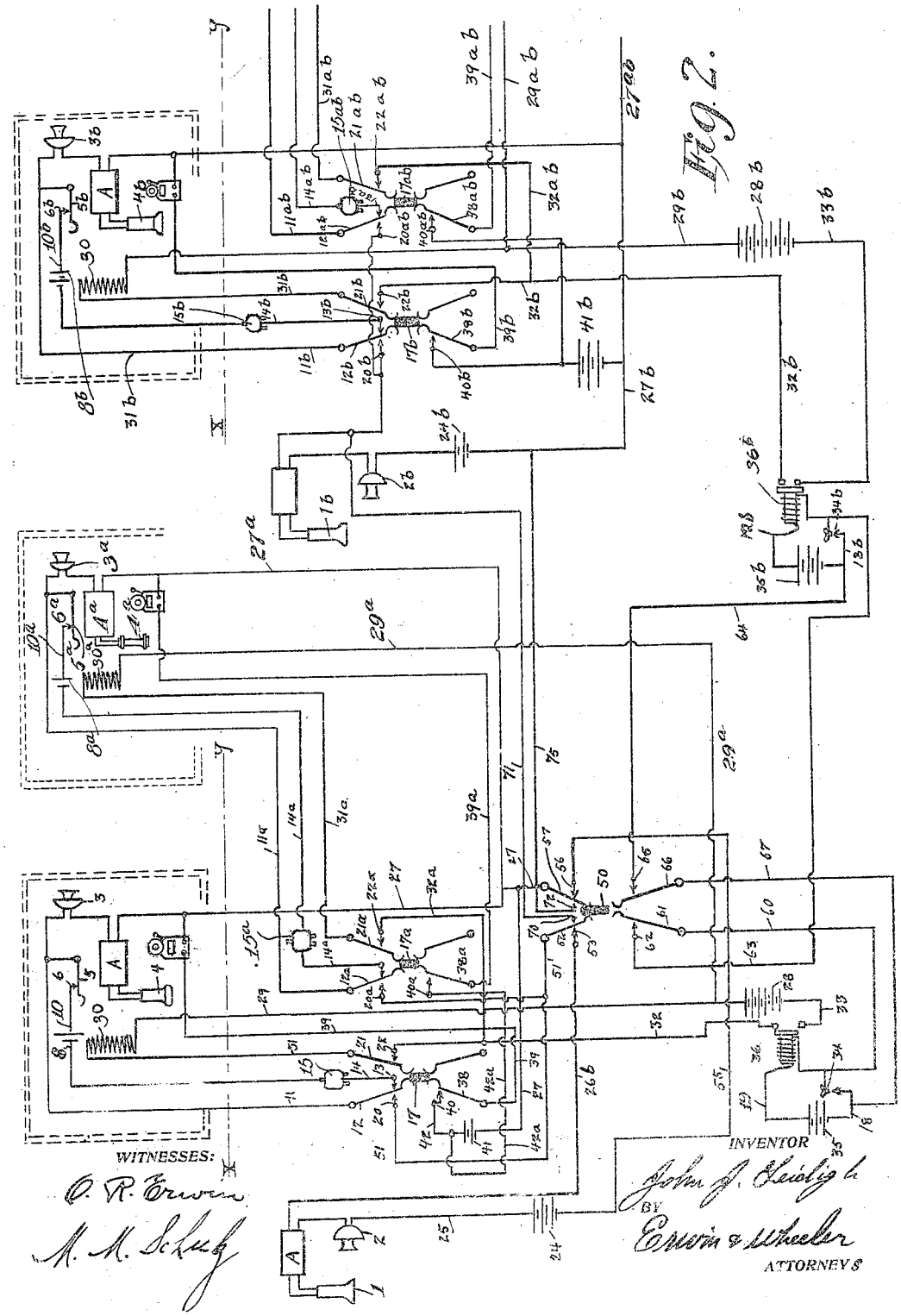

UNITED STATES PATENT OFFICE.

JOHN J. LEIDIGH, OF MILWAUKEE, WISCONSIN, ASSIGNOR TO THE NATIONAL CASH REGISTER COMPANY, OF DAYTON, OHIO, A CORPORATION OF OHIO, (INCORPORATED IN 1906.)

CREDIT-MARKING SYSTEM.

1,145,152.  Specification of Letters Patent.  Patented July 6, 1915.

Application filed July 2, 1906, Serial No. 324,363. Renewed April 13, 1911. Serial No. 620,888.

*To all whom it may concern:*

Be it known that I, JOHN J. LEIDIGH, a citizen of the United States, residing at Milwaukee, county of Milwaukee, and State of Wisconsin, have invented new and useful Improvements in Credit-Marking Systems, of which the following is a specification.

My invention relates to improvements in credit marking systems designed especially for use in stores where it is desirable that the clerks obtain accurate information in the form of a permanent record made by the credit department in reference to the financial standing of a prospective purchaser.

The object of the invention is to combine marking or punching apparatus with a telegraphic or telephonic system of communication in such a manner that a single switch or push button may be utilized in connection with electro-magnetic mechanism for authorizing credits in all departments under the control of any one central operator, the switch or push button being automatically connected through a relay with the credit authorizing means or agency of any given department whenever the central operator answers a call, thus avoiding the possibility of error, for no records can be made in any department, except the one in actual telephonic communication with such operator.

It is customary in systems of the present class to provide some credit authorizing means or agency such as a stamping device, punch or other form of marking device whereby some mark or indication may be made on a credit slip indicating that the particular credit sale involved has been authorized by the credit man.

The particular form of credit authorizing means or agency employed in the present application does not constitute a part of the present invention and any other well known form of authorizing means may be employed without departing from the invention disclosed herein.

For the purpose of describing the complete system there has been employed the form of credit authorizing means constituting the invention disclosed in the co-pending application, Serial No. 779,436, of John J. Leidigh, filed July 7, 1913, which is a division of the present application, comprising a punching device operated by an electric solenoid.

In the following description reference is had to the accompanying drawings in which—

Figure 1 is a diagrammatic view illustrating the application of the invention to a simple system comprising one central and one department station. Fig. 2 is a view similar to Fig. 1, illustrating the invention as applied to a central station having two operators, each controlling a plurality of department stations. Fig. 3 is a view, partly in section, of one of the electro-magnetic punches.

Like parts are identified by the same reference characters throughout the several views.

In Figs. 1 and 2 a broken line $x$—$y$ separates the parts pertaining to the central station from those of the local or department station, most of the parts being illustrated conventionally.

1 is the receiver and 2 the transmitter of a telephone at the central station arranged for ordinary telephonic communication with a telephone at the local station having a receiver 3 and transmitter 4. When the receiver 3 at the department station is removed from the hook 5, the latter rises to contact 6 in the usual manner and closes a circuit of a battery 8 through a drop wire 10, hook 5, line 11, resilient switch arm 12, contact 13 and drop wire 14 with which a drop signal 15 is connected. The operator at the central station then throws line lever 17 to break the drop circuit by moving switch arm 12 from contact 13 to contact 20 and simultaneously move switch arm 21 to contact 22. This connects the talking circuits of the telephonic battery 24 through line 25, the telephonic apparatus of the central station, line 26, contact 20, switch arm 12, line 11, the telephonic apparatus of the department station, and a common return wire 27 leading to battery 24. The same movement of lever 17 connects the punch battery 28 of the department through line 29, the solenoid or electro-magnet of the punch 30, line 31, switch arm 21, contact 22, and line 32, with one relay terminal, the other terminal being connected by return line 33 with the punch battery 28. The push button 34 may then be employed to close a circuit of relay battery 35 through lines 18 and 19 and the electro-magnets of the relay 36 to operate the armature of the relay and close the punch circuit by electrically connecting lines 32 and 33.

It will be understood that a separate line lever 17 must be employed for each department, and therefore the punch of the department in telephonic communication with the central operator will alone be operated when the push button 34 is pressed by such central operator. The circuit of each of the other punches is broken at its respective contact 22 until the corresponding line lever is raised to close the talking circuit of that department.

It is sometimes desirable to call a department from the central office. This is accomplished by swinging the line lever downwardly to push switch arm 38 to contact 40, closing a circuit of the bell battery 41 through line 42, contact 40, arm 38, line 39, the bell 45 and the common return line 27.

Referring to Fig. 2 the switch lever 17ª for the second department and the similar levers for all the other departments are arranged in a manner similar to the lever 17 of the above described department, the lines leading to the second department being illustrated by the same reference numerals with the reference character a added. Like connections for the second operator are distinguished by reference character b. For example, the first department switch lever of the second operator is designated 17ᵇ and the second one 17ᵃᵇ etc. It will be observed that the construction is similar to that of Fig. 1, except that a plurality of central operator's stations are employed and the connections are controlled through a master lever 50, as follows: The terminal 20 instead of being connected directly with the coil A of the operator's telephone (as in Fig. 1) is connected by a line 51 with switch arm 52, which is normally held by the master lever 50 in contact with terminal 53 connected with a line 26ᵇ corresponding with line 26 in Fig. 1. The circuit is completed through the coil A, the telephone apparatus, line 25, talking battery 24, line 55, terminal 56, switch arm 57 and common return wire 27. The line 19 of the first operator's station is connected by line 60 through switch arm 61, terminal 62 and line 63 with the push button 34ᵇ of the second station, a return connection being made through line 64, terminal 65, switch arm 66 and line 67 to line 18 of the first station push button so that the first station relay and punches may be energized from the second station push button when the switch arms 61 and 66 are in contact with their respective terminals.

The terminal 70 is connected by line 71 with terminal 20ᵇ of the second operator's line lever 17ᵇ and the terminal 72 is connected by line 75 with the common return line 27ᵇ of the second operator's station, By throwing the master lever 50 to permit switch arms 52 and 57 to move from contacts 53 and 56 into contact with terminals 70 and 72 respectively, and force switch arms 61 and 66 against contacts 62 and 65 respectively, all the departments normally controlled from the first operator's station may be controlled from the second operator's station.

The punch 30 employed in the present application and illustrated in detail in Fig. 3 of the drawings comprises a solenoid 75, an armature hammer, consisting of a magnetizable core-bar 76 and a punch 77 adapted to be struck by the hammer, and provided with pins 78 arranged to register with die sockets or apertures in a die plate 79, whereby an interposed card or ticket may be perforated in the desired manner.

It will readily be seen that when the master lever 50 is in the position shown in Fig. 2, the two left hand department stations shown in said figure will be under the control of the left hand central station, the switches 17 and 17ª, and switch 34. The right hand department station shown, and the additional department station not shown, but for which the connections "ab" are shown, are under control of the right hand central station, the switches 17ᵇ and 17ᵃᵇ, and switch 34ᵇ. If, however, the master lever 50 is moved downward the telephone of the left hand central station will be thrown entirely out of circuit and its appropriate department stations and their switches 17 and 17ª will be placed under control of the right hand central station and switch 34ᵇ. This construction will enable the division of work between two operators during rush hours, while permitting the entire system to be placed under the control of a single operator when normal business conditions prevail.

Various modifications in the apparatus will be suggested to the ordinary mechanic without departing from the scope of this invention. For example, it is not material to my invention whether the punches are operated directly by the solenoid or whether the same be mechanically actuated and their operation indirectly controlled by electromagnetic mechanism.

Having thus described my invention what I claim as new and desire to secure by Letters Patent is,

1. The combination with a telephonic system comprising a central station and a plurality of department stations, of a series of credit authorizing means, each located at one of the department stations; electro-magnetic mechanism controlling the operation of said credit authorizing means and connected electrically with the central station;

a circuit closer at the central station common to the controlling mechanism of the credit authorizing means of all the departments but normally disconnected electrically therefrom; switches at the central station, each controlling the individual talking circuit pertaining to one of the departments, and also arranged automatically to connect the credit authorizing means controlling mechanism of that department with the common circuit closer at the central station when the telephonic talking circuit is closed for such department.

2. The combination with a telephonic system comprising a central station and a plurality of department stations; of a series of credit authorizing means, each located at one of the department stations; electro-magnetic mechanism controlling the operation of said credit authorizing means and connected electrically with the central station; a circuit closer at the central station common to the credit authorizing means controlling mechanisms of all the departments but normally disconnected electrically therefrom; switches at the central station each controlling the individual talking circuit pertaining to one of the departments and also arranged automatically to connect the credit authorizing means of that department with the common circuit closer at the central station when the telephonic talking circuit is closed for such department, said common circuit closer comprising a relay switch; a local circuit for energizing the relay; and a manually actuated switch for closing the local circuit.

3. The combination with a telephonic system, comprising a central station and a series of department stations; of a series of electro-magnetic credit authorizing means, each located at one of the department stations, and separately connected with a source of electrical energy independent of the telephonic circuits; a series of switch levers at the central station, each controlling the talking telephonic circuit and the credit authorizing circuit of one department; a normally open manually actuated switch at the central station common to the circuits of all the credit authorizing means and adapted to coöperate with the telephonic switch lever in closing a credit authorizing circuit through a department station in telephonic communication with the central station; together with an auxiliary central station and a master lever adapted to disconnect the central station and place its appropriate department stations under the control of the auxiliary central station.

4. In a system of the character described, the combination of a plurality of central stations and a plurality of department stations, a series of credit authorizing means one located at each of the department stations; electro-magnetic mechanism controlling the operation of said credit authorizing means and connected electrically with the central stations; a circuit closer at each of the central stations, each circuit closer being common to the controlling mechanism of the credit authorizing means of all the department stations appropriate to its appropriate central station but normally disconnected electrically therefrom; sets of switches at each of the central stations each switch controlling the individual talking circuit pertaining to one of the departments, and also arranged automatically to connect the credit authorizing means controlling mechanism of that department with the appropriate circuit closer when the telephonic talking circuit is closed for such department.

5. In a system of the character described, a series of central stations and a series of substations each comprising a check punching device, like means at each of the central stations for establishing communication between said central station and any one of its appropriate substations, and a circuit closer at each of the central stations and adapted to be connected with the check punching device of a substation by the said means for establishing communication with said substation, whereby the operation of the circuit closer will produce the operation of the check punching device at the selected substation, and means whereby the substations appropriate to one central station may be placed under the control of another central station.

6. In a credit system, a central station and a series of substations, telephones at the substations connected with the central station, annunciators at the central station for the substations adapted to be operated from the respective substations, a telephone at the central station, switch mechanism for connecting the telephone at the central station with the telephone at any of the substations, check punching devices at the substations having connection with the central station, and a circuit closer at the central station adapted to be placed into connection with the check punching device of any substation by the operation of the switch mechanism for connecting the telephone of that substation with the telephone of the central station, whereby the operation of the circuit closer will produce the operation of the check punching device of that substation which is in telephone communication with the central station.

7. In a credit system, a central station and a series of substations, telephones at the substations connected with the central station, annunciators at the central station for the respective substations, switches at the central station for normally connecting the annunciators with respective substations so as to be operated therefrom, a telephone at the central station adapted to be substituted for the annunciator of any substation by the change in position of the switch for that substation, check punching devices at the substations, a circuit closer at the central station having connection with said switches and adapted to be connected with the check punching device of any substation when the switch for that substation is in position to connect the telephone of said substation with the telephone of the central station, whereby the operation of the circuit closer will produce the operation of the check punching device of that substation having telephone communication with the central station.

8. The combination with a telephonic system, comprising a central station and a series of department stations; of a series of credit authorizing means, one located at each of the department stations, and separately connected with a source of electrical energy independent of the telephonic circuits; a series of switch levers at the central station, each controlling the talking telephonic circuit and the credit authorizing circuit of one department; a normally open manually actuated switch at the central station common to the circuits of all the credit authorizing means, and adapted to coöperate with the telephonic switch lever in closing a credit authorizing circuit through a department station in telephonic communication with the central station; an auxiliary central station having a second manually actuated switch; and a master lever adapted to disconnect certain of said department stations and their appropriate switch levers from the central station and connect them with the auxiliary central station.

9. In a system of the character described, the combination of a plurality of central stations and a plurality of department stations, a series of credit authorizing means one located at each of the departments, electro-magnetic mechanism controlling the operation of said credit authorizing means, certain of which are normally electrically connected with one of said central stations and others with the other of said central stations; a circuit closer at each of said central stations and common to the controlling mechanisms connected with its appropriate central station but normally disconnected therefrom; switches at the central stations each appropriate to one of the department stations and arranged to place its appropriate station under control of its circuit closer; and a master lever operable to place all of the department stations and their connections under the control of one of the said central stations and its circuit closer.

10. In a system of the character described, the combination of a plurality of department stations, credit authorizing means at each of said stations, a plurality of central stations each normally electrically connected with a series of said department stations and their credit authorizing means, a circuit closer at each of said central stations each common to all of the department stations and their credit authorizing means appropriate to its appropriate central station, and a master lever operable to place all of the department stations and their credit authorizing means under the control of one of said central stations and circuit closer.

11. In a system of the character described, the combination of a plurality of department stations, credit authorizing means at each of said stations, a plurality of central stations each normally electrically connected with a series of said department stations and their credit authorizing means, a circuit closer at each of said central stations each common to all of the department stations and their credit authorizing means appropriate to its appropriate central station, switches at the central stations each appropriate to one of the department stations and arranged to place its appropriate station under control of its circuit closer; and a master lever operable to place all of the department stations and their credit authorizing means under the control of one of said central stations and circuit closers.

In testimony whereof I affix my signature in the presence of two witnesses.

JOHN J. LEIDIGH.

Witnesses:
LEVERETT C. WHEELER,
PEARL GROBBEN.